H. L. IDE.
ANIMAL OPERATED LIQUID DISTRIBUTER.
APPLICATION FILED MAY 20, 1914.
1,126,015.
Patented Jan. 26, 1915.
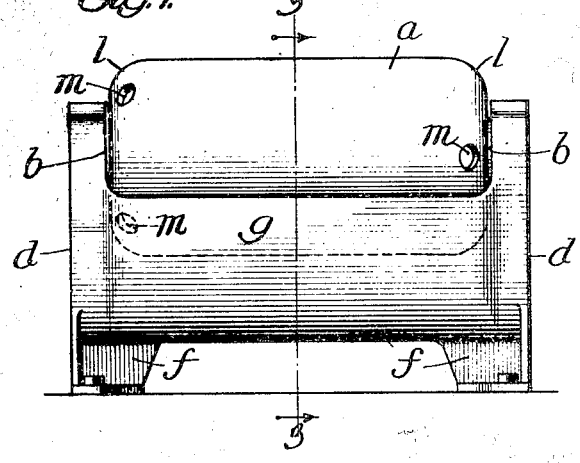
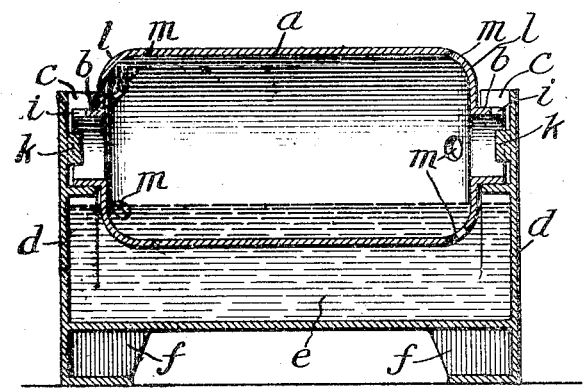
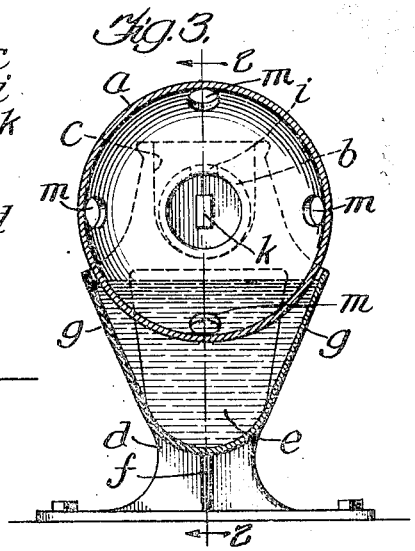
Witnesses:
Inventor:
Harry L. Ide.

UNITED STATES PATENT OFFICE.

HARRY L. IDE, OF SPRINGFIELD, ILLINOIS.

ANIMAL-OPERATED LIQUID-DISTRIBUTER.

1,126,015.   Specification of Letters Patent.   Patented Jan. 26, 1915.

Application filed May 20, 1914. Serial No. 839,676.

*To all whom it may concern:*

Be it known that I, HARRY L. IDE, a citizen of the United States, residing at Springfield, in the county of Sangamon and State of Illinois, have invented a certain new and useful Improvement in Animal-Operated Liquid-Distributers, of which the following is a full, clear, concise, and exact description, reference being had to the accompanying drawings, forming a part of this specification.

My invention relates to devices which may be operated by animals, such as hogs, to cause such devices to apply suitable oil or other liquid to the skin of the animals to rid them of vermin and otherwise contribute to their comfort.

The invention, in its preferred embodiment, is an improvement upon the device disclosed in my United States Letters Patent No. 1,096,244, issued May 12, 1914, but the invention is not to be limited to the form of device illustrated in said patent.

The device illustrated in my aforesaid patent includes a trough for holding the liquid, and a horizontally mounted roller overhanging a longitudinal side of the trough and projecting into the trough space to enable it, as it is being turned by the animal, to transfer liquid from the trough space to the animal. As illustrated in the patent the liquid holding capacity of the trough of the prior device is decreased by an amount equal to the space occupied by the portion of the roller projecting below the level of the liquid in the trough and the trough is replenished from a source of supply located to one side thereof.

In the device of my present invention the rounded corners of the roller are perforated in order that liquid may be transferred directly from the interior to the exterior of the roller. It has been found, by experiment, that the cylindrical wall of the roller cannot be itself perforated since the liquid would fly away owing to centrifugal action. It has also been found that the end walls of the roller cannot be perforated for the purpose of conveying the liquid to the animal since the liquid would not flow in the proper direction. The perforations are therefore located directly in the curved edges at the ends of the roller which, owing to their curvature, invite the animal to use these portions of the roller in transferring the liquid to his body.

I will explain my invention more fully by reference to the accompanying drawing showing the preferred embodiment thereof and in which—

Figure 1 is a side view of the preferred form of my present invention; Fig. 2 is a longitudinal sectional view on line 2 2 of Fig. 3; and Fig. 3 is a cross sectional view on line 3 3 of Fig. 1.

Like parts are indicated by similar characters of reference throughout the different figures.

The horizontally mounted roller $a$ is provided with trunnion projections $b$ at its ends, these projections being substantially co-axial with the roller. The trunnions $b$ are supported by the bottom parts of the insetting pockets $c$ which are formed in the upper extensions of the end walls $d$ of a trough $e$. The trough is provided with suitable pedestals $f$ to permit attachment of the device to a suitable foundation structure. The longitudinal side walls $g$ of the trough $e$ are disposed below the horizontal plane passing through the axis of the roller $a$. The horizontal plane in which the upper margins of the side walls $g$ are included also preferably includes the chord subtending an arc that approximates one-third of the circle of the roller $a$. The sides of the roller thus overhang the underlying trough. The hog thus has opportunity to rub against the lower half of the roller thereby readily to effect its rotation, means being provided for preventing the hog from materially lifting the roller out of the trough as it rapidly revolves the roller. To this end the trunnions are desirably made hollow, a slot $i$ (extending longitudinally of the roller) extending through each trunnion to permit of the passage of insetting vertically elongated or upright lugs $k$ (cast upon the trough structure and extending short distances into the pockets $c$) when the roller is to be mounted within its bearings. The slots $i$ are but a trifle wider than the width of the upright lugs $k$ so that in all positions of the roller, excepting that which the roller is caused to assume for the purpose of its assembly or removal, the slots $i$ cannot be passed over the lugs $k$ whereby the roller cannot well be dislodged as it is being rapidly turned. The lugs $k$ are sufficiently shorter than the internal diameters of the hollow trunnions $b$ and are so disposed with respect to the pockets $c$ as always to permit limited bodily elevation of the roller so that any water that may have been caught in the trough cannot, in freezing, burst the machine by the upward pressure which the freezing water would exert upon the roller. The external surface of the roller itself is preferably smooth, to prevent the roller from scraping dirt from the hog, the smooth surface of the roller also avoiding irritation of the skin. The ends of the cylindrical roller are rounded at $l$, the entire roller thus being of a formation which will enable it, as it is being turned, to transfer oil or other liquid to various portions of the body of the hog, the rounded ends of the roller being particularly adapted to transfer the oil to the ear and shoulder portions of the animal.

The apertures are so located in line with the inner cylindrical surface of the roller that all of the oil within the roller will drain therefrom when the level of the oil in the trough has been sufficiently reduced to permit of the total outflow of oil from the roller. Further advantage in locating the apertures $m$ in the curved portions $l$ of the roller resides in the reduction of agitation consequent upon the rotation of the roller within the oil.

The curved surfaces at $l$ are, by means of the location thereat of the apertures $m$, maintained thoroughly oiled by oil which will work its way out of the elevated apertures whereby the curved ends of the roller are most effectively maintained coated with oil to keep the ends of the roller constantly prepared for the transfer of oil to the ears, neck and contiguous parts of the hog, total dependence thus not being placed upon the oil within the trough for maintaining the curved ends of the roller coated. It will be observed that the holes $m$ at one end are staggered with respect to the holes at the other end whereby the number of holes formed in the roller may be reduced to the minimum. As illustrated, there are eight holes $m$ in the roller that are spaced apart 45°, there thus being sufficient openings to insure the location of some opening approximately vertically beneath the axis of the roller to insure the flow of all of the liquid from the roller to the trough when the liquid level has been sufficiently reduced.

I claim:—

1. A device for enabling an animal to apply liquid to its skin including a trough for holding the liquid and a rotatable hollow roller projecting into the trough space and having a rounded corner at an end that enters the trough space and apertured at an intermediate portion of the curve of said rounded corner at places distributed about the roller to permit the flow of liquid between the roller interior and the trough space.

2. A device for enabling an animal to apply liquid to its skin including a trough for holding the liquid and a rotatable hollow roller projecting into the trough space and having a rounded corner at an end that enters the trough space and apertured at an intermediate portion of the curve of said rounded corner at places distributed about the roller to permit the flow of liquid between the roller interior and the trough space, the apertures being located in line with the inner cylindrical surface of the roller to enable the discharge of all of the liquid from the roller.

In witness whereof, I hereunto subscribe my name this 14 day of May A. D., 1914.

HARRY L. IDE.

Witnesses:
 GUY H. GRANT,
 REUBEN H. BRAND.